(12) United States Patent
Xiu et al.

(10) Patent No.: US 11,764,449 B2
(45) Date of Patent: Sep. 19, 2023

(54) METAMATERIAL-BASED VARIABLE CAPACITOR STRUCTURE

(71) Applicant: BEIJING HUAMETA TECHNOLOGY CO. LTD., Beijing (CN)

(72) Inventors: Wei Xiu, Beijing (CN); Haiyan Tian, Beijing (CN); Guang Yang, Beijing (CN); Yingzhou Pei, Beijing (CN)

(73) Assignee: BEIJING HUAMETA TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 16/954,434

(22) PCT Filed: Mar. 24, 2020

(86) PCT No.: PCT/CN2020/080886
§ 371 (c)(1),
(2) Date: Jun. 16, 2020

(87) PCT Pub. No.: WO2020/244282
PCT Pub. Date: Dec. 10, 2020

(65) Prior Publication Data
US 2022/0130618 A1    Apr. 28, 2022

(30) Foreign Application Priority Data
Jun. 3, 2019  (CN) .......................... 201910476279.3

(51) Int. Cl.
*H01P 1/18*  (2006.01)
*H01G 7/06*  (2006.01)
*H01Q 3/36*  (2006.01)

(52) U.S. Cl.
CPC ............... *H01P 1/181* (2013.01); *H01G 7/06* (2013.01); *H01P 1/18* (2013.01); *H01P 1/184* (2013.01); *H01Q 3/36* (2013.01)

(58) Field of Classification Search
CPC .. H01P 1/181; H01P 1/18; H01P 1/184; H01P 9/00
USPC .......................................................... 333/161
See application file for complete search history.

(56) References Cited

U.S. PATENT DOCUMENTS

| | | | | |
|---|---|---|---|---|
| 5,936,484 A | * | 8/1999 | Dolfi et al. ............. | H01P 1/181 333/156 |
| 2020/0203827 A1 | * | 6/2020 | Wang et al. ............ | H01P 1/184 |
| 2020/0266511 A1 | * | 8/2020 | Kong et al. ............. | H01P 1/18 |

* cited by examiner

*Primary Examiner* — Benny T Lee
(74) *Attorney, Agent, or Firm* — Getech Law LLC; Jun Ye

(57) ABSTRACT

The present invention discloses a metamaterial-based variable capacitor structure, comprising the first substrate, the second substrate, the metamaterial dielectric layer, the metal floor layer between the first substrate and the metamaterial dielectric layer, the gaps and isolation holes periodically arranged on metal floor layer, the microstrip line between the second substrate and the metamaterial dielectric layer, the periodically loaded branches, the bias line and the choke branch on the microstrip line, and two feeding terminals on both ends of microstrip line. The capacitance value of the metamaterial-based capacitor with variable dielectric constant is adjusted by controlling the voltage applied to the said bias line, thereby realizing the time-frequency response, frequency selection, phase shift control, transmission matching, etc. based on the variable capacitor structure.

9 Claims, 9 Drawing Sheets

METAMATERIAL-BASED VARIABLE CAPACITOR STRUCTURE

TECHNOLOGY FIELD

The present invention relates to the field of phase shifter and antenna technology, particularly to the continually analog metamaterial-based variable capacitor.

BACKGROUND ART

The variable capacitor is a capacitor which has a capacitance that can be adjusted within a certain range. The variable capacitor is widely used in time-frequency response, frequency selection, phase shift control, transmission matching and other technology fields. Realization methods based on the variable capacitor structure of phase shifter became the technical hot spot.

Phase shifters are widely used in many RF devices such as phased array antennas, phase modulators and harmonic distortion cancelers. In order to obtain better application effect, higher requirements such as the miniaturization, light weight, miniaturized, light weight, low insertion loss, and good flatness within the entire operating bandwidth, large phase shift range, wide operating bandwidth, good input and output port matching, low power consumption, and lower costs for the performance of phase shifters were also presented.

There are many realization methods of the existing phase shifters, but they all have certain application limitations. Among these limitations, the active phase shifter consumes large power and has limited application scenarios. In the passive phase shifters, the switch-type phase shifters based on PIN diodes, CMOS, MEMS, etc. can't achieve the continuous phase adjustment, which are limited in the application scenarios that require the miniaturization and high phase shift accuracy; the reflective or variable capacitor phase shifters based on the variable capacitance diodes will reduce the figure of merit (FOM) due to the increased insertion loss in the high-frequency applications and affect performance indicators. In recent years, the variable capacitor phase shifters based on the ferroelectric thin film BST, liquid crystal and other metamaterials have received more and more attention because of the large adjustable range of dielectric constant or high FOM of the variable capacitor and the huge application prospect in the design research with the development of materials science. There were also many related patent applications, such as electronically steerable plane phased array antenna (Chinese Patent Application No. 201280058131.4, published Aug. 6, 2014), liquid crystal phase shifter and antenna (Chinese Patent Application No. 201810548743.0, published Sep. 21, 2018), a liquid crystal phase shifter and electronic equipment (Chinese Patent Application No. 201810333111.2, published Sep. 7, 2018) and MULTI-LAYERED SOFTWARE DEFINED ANTENNA AND METHOD OF MANUFACTURE (US Patent Application No. 20180062266, published Mar. 1, 2018), but the existing designs require the longer transmission line to achieve 360° phase shift, thereby resulting in larger size, decreased FOM, etc., which are not conducive to the miniaturization and integration of RF microwave devices and antennas, but also reduce the design freedom of antennas. The existing designs are not conducive to the multi-polarization ability of antennas, and increase the design and processing difficulty of the feeding network; In addition, there is no better solution to minimize the influence of the bias circuit for adjusting the dielectric constant of metamaterial dielectric layer on the RF signal.

SUMMARY OF THE INVENTION

In order to overcome the existing technical deficiencies, the present invention discloses a metamaterial-based variable capacitor structure, the structure effectively reduces the size of the variable capacitance structure and the shunt attenuation of the radio frequency signal due to the bias circuit, thereby improving the figure of merit (FOM) of the structure, largely solving the miniaturization, batching, integration and cost reduction problems of radio frequency microwave devices and antenna, and also adding more freedom to the antenna design.

Technical Solution Used in the Present Invention for Solving the Above-Mentioned Problems A metamaterial-based variable capacitor structure, comprising:
  The first substrate (102) and the second substrate (103) set oppositely, and the metamaterial dielectric layer (107) located between the first substrate (102) and the second substrate (103);
  The metal floor layer (104) between the first substrate (102) and the metamaterial dielectric layer (107); at least 2 gaps periodically arranged on the metal floor layer (104);
  The microstrip line (108) between the second substrate (103) and metamaterial dielectric layer (107), and the bias line (109) loaded on the microstrip line (108).
  Preferably, the microstrip line (108) has the periodically loaded branches (202), and two feeding terminals (111) and (112).
  Preferably, the metamaterial dielectric layer is composed of one or multiple layers of variable dielectric constant material, and the material can be either the liquid crystal or ferroelectric film.
  Preferably, the structure further comprises:
  The metal floor layer (104) also has the isolation hole (106), and the bias line (109) is further loaded with choke branches (110).
  Preferably, the gaps (105) can be centered relative to the microstrip line (108), or can be a certain distance away from the microstrip line (108), and their arrangement can be uniformly periodic, non-uniformly periodic, uniformly symmetrical, uniformly crossed, or non-uniformly symmetrical or crossed.
  Preferably, the isolation hole (106) can be rectangular, circular, triangular, or rhombic; there can be only one or many isolation holes (106) in series along the bias line.
  Preferably, the choke branches (110) can be fan-shaped, triangular, linear, or rectangular; there can be only one or many choke branches (110) on the same side or both sides of bias line.
  Preferably, the branches (202) can be arranged in the cross or non-cross type; the length of branches (202) can be equal or not equal to that of the gaps (105); the branches (202) can be uniformly or non-uniformly arranged; the branches (202) can be corresponding or not corresponding to with the gaps (105), and there is no gap (105) in the position of the branch (202) directly facing the metal floor layer (104).
Preferably, the bias line (109) can also be loaded on the branches (202) of the microstrip line (108).
  Preferably, the microstrip line (108) and gaps (105) can be arranged linearly or in the curve type of 180° or 90°; the gaps (105) can be fan-shaped or rectangular; the gaps (105) can be uniformly or non-uniformly arranged.

Compared with the Existing Technologies, the Present Invention has the Following Beneficial Effects (1) The present invention fully utilizes the method of slitting the microstrip line floor and loading the branches on the microstrip line to obtain the slow wave effect of the microstrip line, realize the purpose of effectively reducing the phase shifter size and loss and thus improve the FOM of phase shifter.

(2) The present invention utilizes the bias line with isolation holes and choke branches or made from high-resistance ITO (indium tin oxide), NiCr (nickel chromium), or some other material with a resistivity greater than $1\times10^5$ Ω·m, effectively reducing the adverse effect of the bias circuit on the performance of phase shifter, further improving the FOM of phase shifter; and the bias line with isolation holes and choke branches can be integrated with the transmission line of phase shifter, which reduces the process flow and the production cost compared with existing ITO bias line.

BRIEF DESCRIPTION OF DRAWINGS

Various other advantages and benefits will become apparent to those of ordinary skill in the art upon reading the detailed description of the preferred embodiments below. The drawings are only for the purpose of illustrating the preferred embodiments and are not to be considered as limiting the invention. Moreover, the same reference numerals are used through the drawings and as described in the detailed description to indicate the same parts. In the drawings:

FIG. 2 (b) is the top view of the second substrate upper surface of a metamaterial-based capacitor structure according to a specific embodiment 1 of the present invention;

FIG. 2 (c) is the top view of a metamaterial-based capacitor structure according to a specific embodiment 1 of the present invention;

FIG. 4 (b) is the top view of the second substrate upper surface of a metamaterial-based capacitor structure according to a specific embodiment 2 of the present invention;

FIG. 4 (c) is the top view of a metamaterial-based capacitor structure according to a specific embodiment 2 of the present invention;

FIG. 4 (d) is the equivalent circuit model according to a specific embodiment 2 of the present invention;

FIG. 6 (b) is the top view of a specific embodiment 2 relating to the bias line made from ITO (indium tin oxide), NiCr (nickel chromium), or some other material with a resistivity greater than $1\times10^5$ Ω·m;

FIG. 6 (c) is the top view of a specific embodiment 3 relating to the bias line made from ITO (indium tin oxide), NiCr (nickel chromium), or some other material with a resistivity greater than $1\times10^5$ Ω·m;

DETAIL DESCRIPTION OF EMBODIMENTS OF THE PRESENT INVENTION

Figure 1:
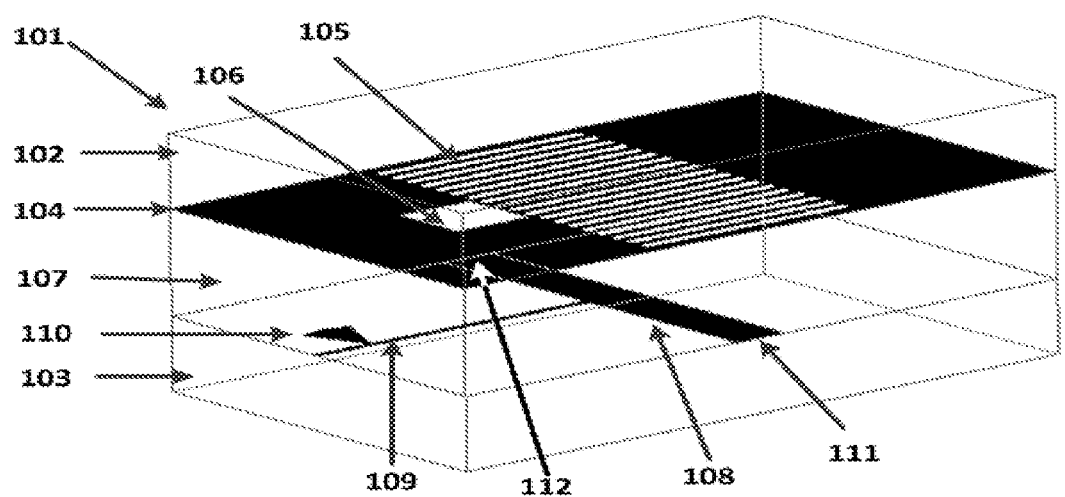
FIG. 1 is the side view of a metamaterial-based capacitor structure according to a specific embodiment 1 of the present invention.

Hereinafter, the illustrative embodiments of the present disclosure will be described in more detail with reference to the attached drawings. Although the illustrative embodiments of the present disclosure are shown in the drawings, it should be understood that the present disclosure can be implemented in various forms and should not be limited to the embodiments set forth herein. On the contrary, these embodiments are provided to get a thorough understanding of the present disclosure, and to fully convey the scope of the present disclosure to the technicians in the art.

Embodiment 1

As shown in FIG. 1, the embodiment of the present invention provides a metamaterial-based variable capacitor structure 101, comprising: the first substrate 102 and the second substrate 103 set oppositely, and the metamaterial dielectric layer 107 located between the first substrate 102 and the second substrate 103, the metal floor layer 104 located between the first substrate 102 and the metamaterial dielectric layer 107, at least two periodically arranged gaps 105 and isolation holes 106 on the metal floor layer 104, the microstrip line 108, bias line 109 and choke branch 110 located between the second substrate 103 and the metamaterial dielectric layer 107, and two feeding terminals 111 and 112 on both ends of microstrip line 108.

Figure 2:
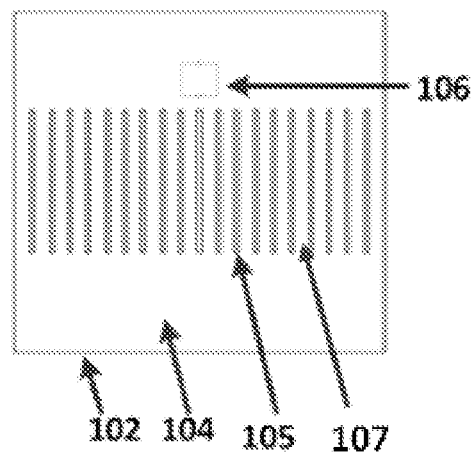
FIG. 2 (a) is the top view of the first substrate lower surface of a metamaterial-based capacitor structure according to a specific embodiment 1 of the present invention.
Figure 2:
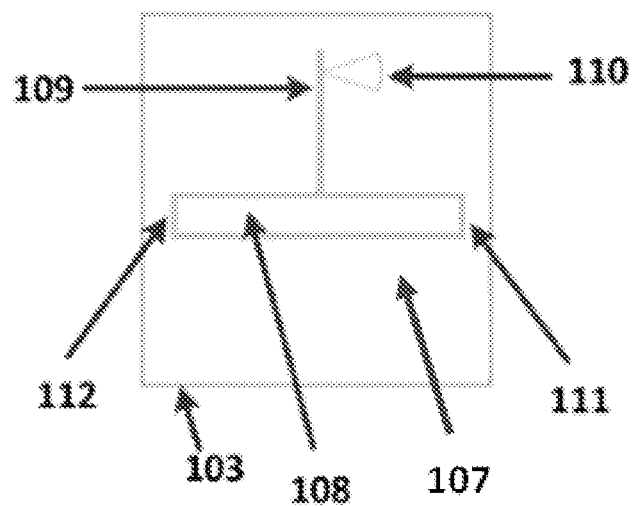
Figure 2:
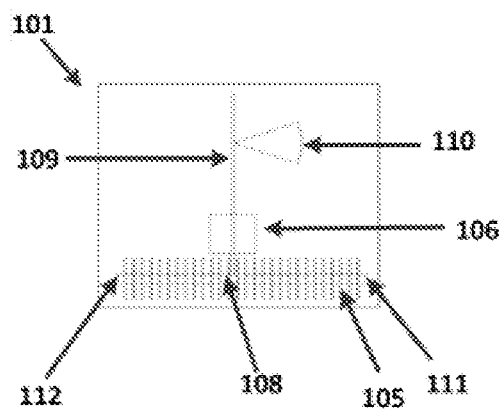

FIGS. 2(a), 2(b) and 2(c) are respectively the top views of the lower surface of the first substrate 102 as shown in FIG. 2(a), the upper surface of the second substrate 103 as shown in FIG. 2(b), and overall body of the metamaterial-based variable capacitor structure according to a specific embodiment 1 of the present invention. In this structure, the periodically arranged gaps 105 as shown in FIGS. 2(a) and 2(c) are slotted on floor layer 104 as shown in FIG. 2(a) directly facing the microstrip line 108 as shown in FIGS. 2(b) and 2(c) to form the slow-wave transmission structure, so that the transmission route required for phase shift 360° in the metamaterial dielectric layer is shortened, thereby effectively reducing the overall structure size and obtaining better FOM.

The metamaterial-based variable capacitor structure is composed of the metal floor layer 104, the periodically arranged gaps 105, the metamaterial dielectric layer 107 as shown in FIGS. 2(b) and 2(c), and the microstrip line 108. Among these components, the metamaterial dielectric layer 107 is composed of one or multiple layers of variable dielectric constant material, and the material can be the liquid crystal, ferroelectric thin film BST, etc. The dielectric constant of the metamaterial dielectric layer can be adjusted to change the capacitance value of the metamaterial-based variable capacitor, thereby changing the phase shift amount of the metamaterial-based phase shifter. The bias line 109 for changing the dielectric constant of the metamaterial dielectric layer 107 is loaded on the microstrip line 108. In order to reduce the impact of the bias line 109 as shown in FIGS. 2(b) and 2(c) on the radio frequency signal, the isolation hole 106 as shown in FIGS. 2(a) and 2(c) is punched on the corresponding bias line 109 at the floor layer 104 where the isolation hole is close to the microstrip line 108. The principle of radio frequency transmission line mismatch caused by the impedance can effectively suppress the phenomenon of radio frequency signal loss caused by the transmission along the bias line. Meanwhile, combined with the choke branch 110 as shown in FIGS. 2(a) and 2(c) loaded on the bias line 109 having a certain distance from the microstrip line 108, the structure can greatly reduce the shunt attenuation of RF signals by the bias line compared with the conventional bias line.

According to the liquid crystal metamaterial-based variable capacitor described in Embodiment 1 and the test results of physical prototype working at 12.25 Ghz-12.75 Ghz showing that FOM is 90°/dB and the area required for phase shift 360° is only 1 mm*30 mm in the design with a liquid crystal layer thickness of only 5 μm, the index is better than the existing similar phase shifters.

Embodiment 2

Figure 3:
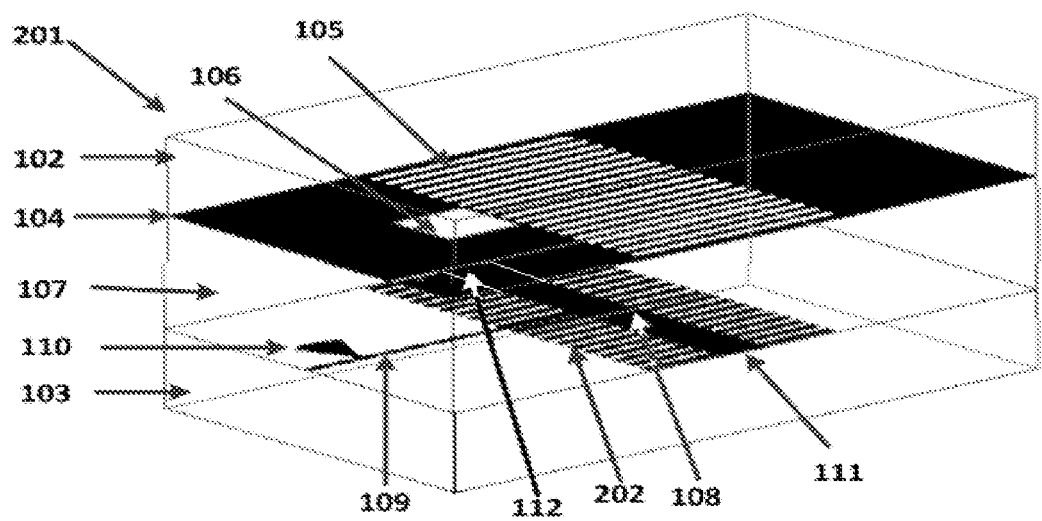
FIG. 3 is the top view of a metamaterial-based capacitor structure according to a specific embodiment 2 of the present invention.

As shown in FIG. 3, the embodiment of the present invention provides a metamaterial-based variable capacitor structure 201, comprising: the first substrate 102 and the second substrate 103 set oppositely, and the metamaterial dielectric layer 107 located between the first substrate 102 and the second substrate 103, the metal floor layer 104 located between the first substrate 102 and the metamaterial dielectric layer 107, at least two periodically arranged gaps 105 and isolation holes 106 on the metal floor layer 104, the microstrip line 108 between the second substrate 103 and the metamaterial dielectric layer 107, the branches 202, the bias line 109 and choke branch 110 periodically loaded on the microstrip line 108, and two feeding terminals 111 and 112 on both ends of microstrip line 108.

FIGS. 4(a), 4(b) and 4(c) are respectively the top views of the lower surface of the first substrate 102 as shown in FIG. 4(a) the upper surface of the second substrate 103 as shown in FIG. 4(b) and overall body of the metamaterial-based variable capacitor structure according to a specific embodiment 2 of the present invention. In this structure, the periodically arranged gaps 105 as shown in FIG. 4(a) on the floor layer 104 as shown in FIG. 4(a) directly facing the microstrip line 108 as shown in FIGS. 4(b) and 4(c) and the branches 202 as shown in FIGS. 4(b) and 4(c) periodically loaded on the microstrip line 108 together form the slow-wave transmission structure, so that the transmission route required for phase shift 360° in the metamaterial dielectric layer is shortened, thereby effectively reducing the size of phase shifter and obtaining better FOM.

The metamaterial-based variable capacitor structure is composed of the metal floor layer 104, the periodically arranged gaps 105, the metamaterial dielectric layer 107, and the microstrip line 108. Among these components, the metamaterial dielectric layer 107 is composed of one or multiple layers of variable dielectric constant material, and the material can be the liquid crystal, ferroelectric thin film BST, etc.

Figure 4:
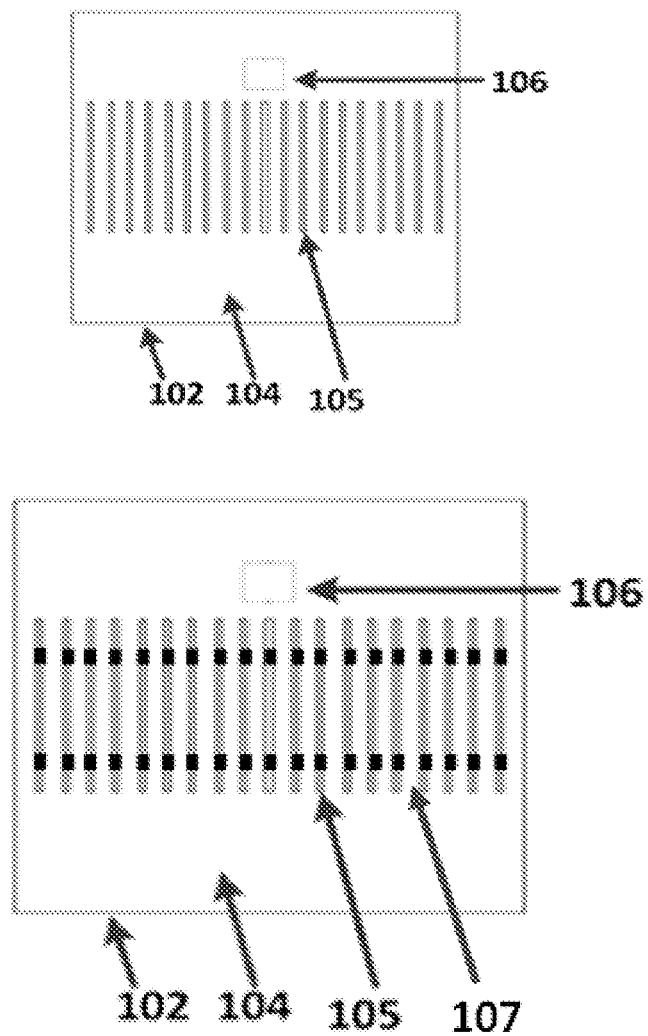
FIG. 4 (a) is the top view of the first substrate lower surface of a metamaterial-based capacitor structure according to a specific embodiment 2 of the present invention.
Figure 4:
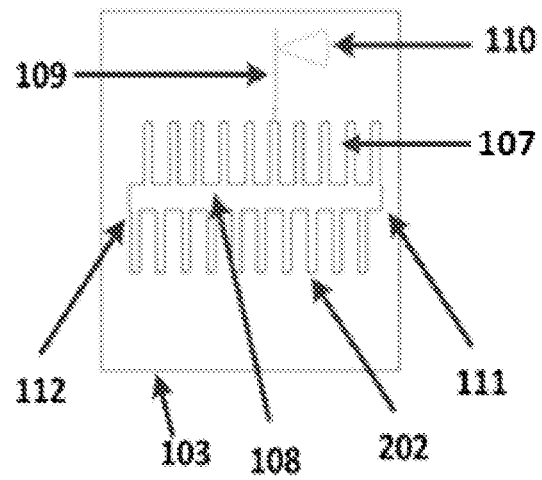
Figure 4:
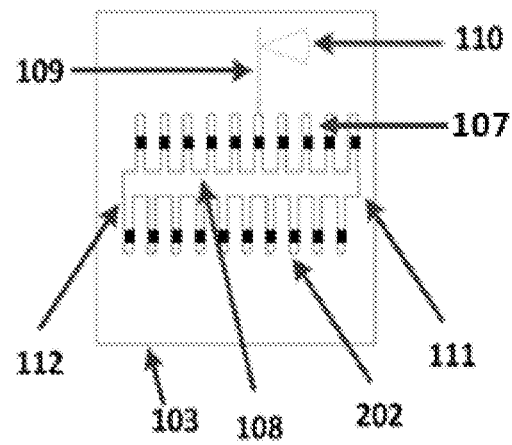
Figure 4:
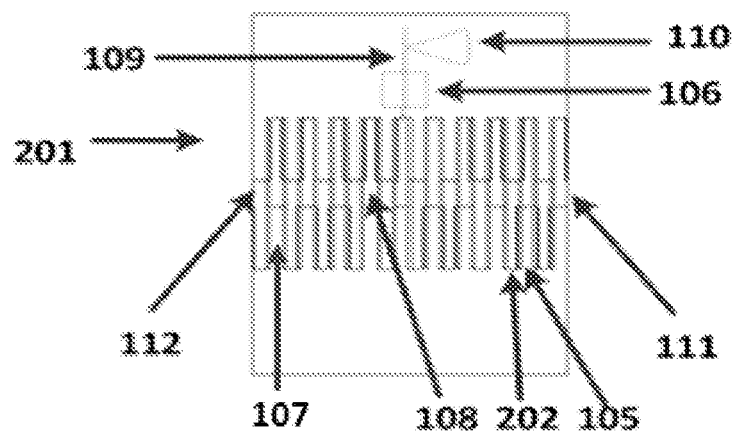
Figure 4:
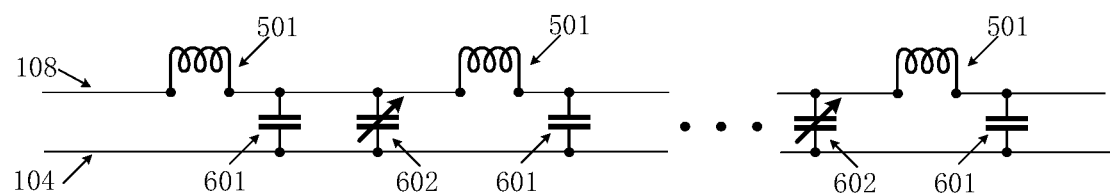

FIG. 4 (d) is the equivalent circuit model according to a specific embodiment 2 of the present invention; 501 is the equivalent inductance formed by the gaps 105 as shown in FIGS. 4(a) and 4(c) and the metal floor layer 104; 601 is the equivalent capacitance formed by the microstrip line 108 and the metal floor layer 104; and 602 is the equivalent variable capacitance formed by the microstrip line 108 and the loaded branches 202 together with the metal floor layer 104.

The capacitance value 602 can be changed by adjusting the dielectric constant of the metamaterial dielectric layer, thereby changing the phase shift amount of the metamaterial-based phase shifter. The bias line 109 as shown in FIGS. 4(b) and 4(c) for changing the dielectric constant of the metamaterial dielectric layer 107 is loaded on the microstrip line 108 or branch 202 as shown in FIGS. 4(b) and 4(c). In order to reduce the impact of the bias line 109 on the radio frequency signal, the isolation hole 106 is punched on the corresponding bias line 109 at the floor layer 104 where the isolation hole is close to the microstrip line 108. The principle of radio frequency transmission line mismatch caused by the impedance can effectively suppress the phenomenon of radio frequency signal loss caused by the transmission along the bias line. Meanwhile, combined with the choke branch 110 loaded on the bias line 109 having a certain distance from the microstrip line 108, the structure can greatly reduce the shunt attenuation of RF signals by the bias line compared with the conventional bias line.

According to the liquid crystal metamaterial-based variable capacitor described in Embodiment 2 and the test results of physical prototype working at 12.25 Ghz-12.75 Ghz showing that FOM is 72°/dB and the area required for phase shift 360° is only 2.5 mm*3 mm in the design with a liquid crystal layer thickness of only 5 the index is better than the existing similar phase shifters.

Embodiment 3

Figure 5:
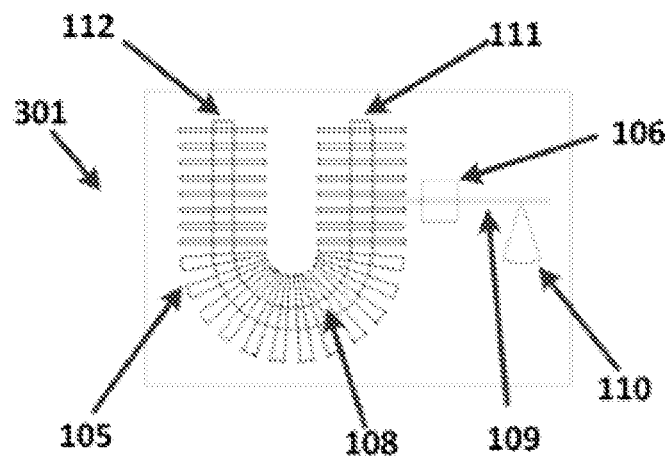
FIG. 5 is the top view of a metamaterial-based capacitor structure according to a specific embodiment 3 of the present invention.

As shown in FIG. 5, the embodiment of the present invention provides a metamaterial-based variable capacitor 301. The structure is a curved connection structure extended from the metamaterial-based variable capacitor 101 described in Embodiment 1 as shown in FIG. 1. This structure makes the routing of phase shifter more flexible, and can better adapt to the routing of phase shifter under different space conditions.

Embodiment 4

Figure 6:
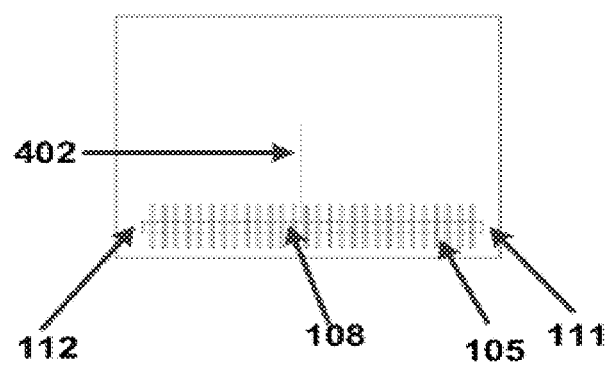
FIG. 6 (a) is the top view of a specific embodiment 1 relating to the bias line made from ITO (indium tin oxide), NiCr (nickel chromium), or some other material with a resistivity greater than $1\times10^5$ Ω·m.
Figure 6:
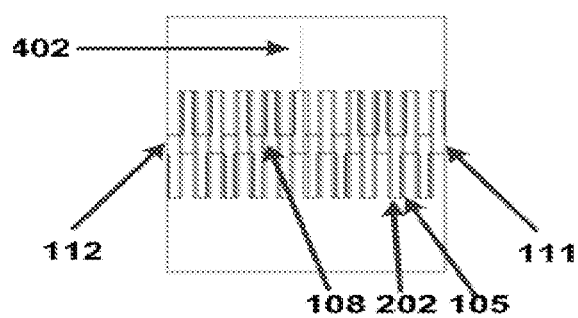
Figure 6C:
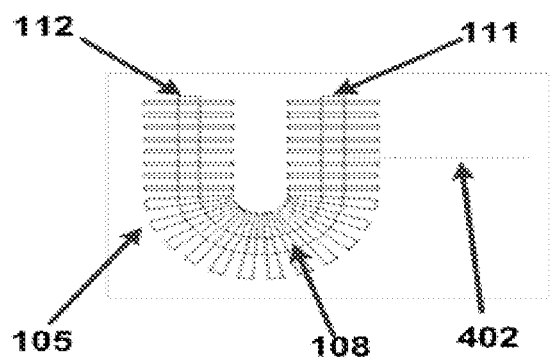

As shown in FIGS. 6(a), 6(b) and 6(c), the bias line for the metamaterial-based variable capacitors 101, 201 and 301 in the embodiments 1, 2 and 3, respectively of the present invention can be replaced by the bias line 402 made from ITO (indium tin oxide), NiCr (nickel chromium), or some other material with a resistivity greater than $1 \times 10^5$ Ω·m. When the bias line 402 is made from ITO (indium tin oxide), NiCr (nickel chromium), or some other material with a resistivity greater than $1 \times 10^5$ Ω·m, the bias line structure can be loaded with the isolation hole 106 and choke branch 110 according to embodiments 1, 2 or 3 or directly loaded without the isolation hole 106 and choke branch 110 on the microstrip line 108. In such case, the thickness of the bias line 402 can be from 10~200 nm, and the choke attenuation can be also decreased by properly controlling the thickness and square resistance of the coating on the bias line 402.

Embodiment 5

Figure 7:
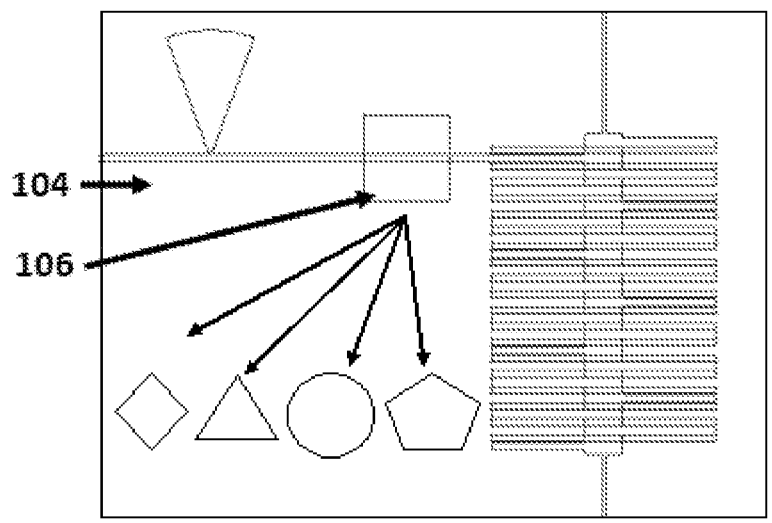
FIG. 7 is the optional shape schematic diagram of the isolation hole on the floor layer of the present invention.

As shown in FIG. 7, the isolation hole 106 on the floor layer 104 can be either rectangular or circular, but is not limited to triangular, rhombic, or polygonal hole.

Embodiment 6

Figure 8:
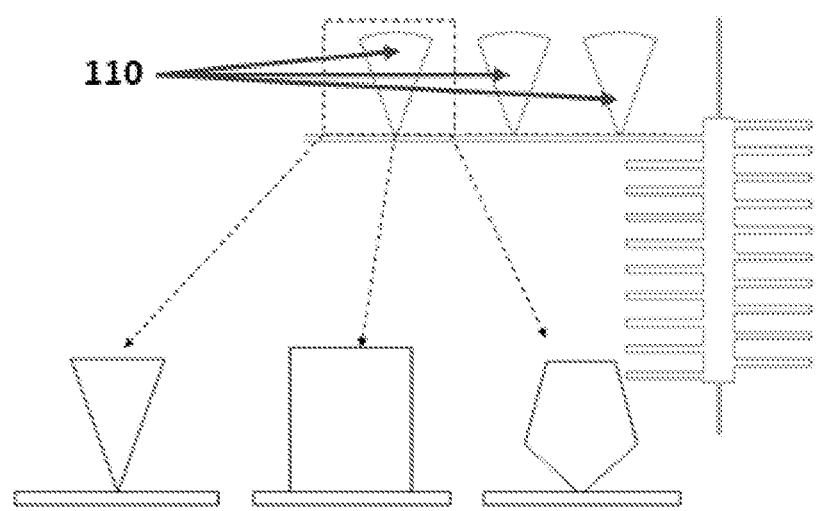
FIG. 8 is the optional shape schematic diagram of the choke branch.

As shown in FIG. 8, the choke branch 110 can be either the loaded fan-shaped or the loaded triangular, but is not limited to the loaded rectangular structure, etc.

The above are only the preferred embodiments of the present invention, but the scope of protection of the present invention is not so limited. The changes or replacement that any person skilled in the art can be easily envisioned within the technical scope disclosed by the present invention shall be covered by the protection scope of the present invention. Therefore, the protection scope of the present invention shall be subject to the protection scope of the claims.

What is claimed:

1. A metamaterial-based variable capacitor structure, comprising:
   a first substrate and a second substrate set oppositely, and a metamaterial dielectric layer located between the first substrate and the second substrate;
   a metal floor layer, having an isolation hole, between the first substrate and the metamaterial dielectric layer; at least 2 gaps periodically arranged on the metal floor layer; and
   a microstrip line, having periodically loaded branches and two feeding terminals, between the second substrate and the metamaterial dielectric layer, and a bias line loaded on the microstrip line.

2. The metamaterial-based variable capacitor structure according to claim 1, characterized in that the microstrip line and respective gaps of the periodically loaded branches can be arranged linearly or in a curve type of 180° or 90°; the respective gaps can be rectangular; the respective gaps can be uniformly arranged.

3. The metamaterial-based variable capacitor structure according to claim 1, characterized in that the metamaterial dielectric layer is composed of one or multiple layers of variable dielectric constant material, and the variable dielectric constant material can be either liquid crystal or ferroelectric film.

4. The metamaterial-based variable capacitor structure according to claim 1, characterized in that the bias line is further loaded with a choke branch.

5. The metamaterial-based variable capacitor structure according to claim 4, characterized in that the choke branch can be fan-shaped, triangular, linear, or rectangular; wherein the choke branch can be only one choke branch or many choke branches.

6. The metamaterial-based variable capacitor structure according to claim 4, characterized in that the isolation hole can be rectangular, circular, triangular, or rhombic; and the isolation hole can be only one isolation hole or many isolation holes in series along the bias line.

7. The metamaterial-based variable capacitor structure according to claim 1, characterized in that the at least 2 gaps periodically arranged on the metal floor layer are centered relative to the microstrip line, or are a certain distance away from the microstrip line, and the arrangement of the at least 2 gaps periodically arranged on the metal floor layer are uniformly periodic, non-uniformly periodic, uniformly symmetrical, uniformly crossed, or non-uniformly symmetrical or crossed.

8. The metamaterial-based variable capacitor structure according to claim 1, characterized in that the periodically loaded branches on the microstrip line can be arranged in a cross type pattern; the periodically loaded branches on the microstrip line have respective lengths that can be equal to or not equal to lengths of the respective gaps; the periodically loaded branches on the microstrip line can be uniformly or non-uniformly arranged; the periodically loaded branches on the microstrip line can be corresponding to or not corresponding to the respective gaps, and there is no gap on the position of the periodically loaded branches on the microstrip line directly facing the metal floor layer.

9. The metamaterial-based variable capacitor structure according to claim 1, characterized in that the bias line can be loaded on the branches of the microstrip line.

* * * * *